May 22, 1923.
H. C. LORD
KNUCKLE JOINT
Filed Jan. 17, 1921
1,456,068
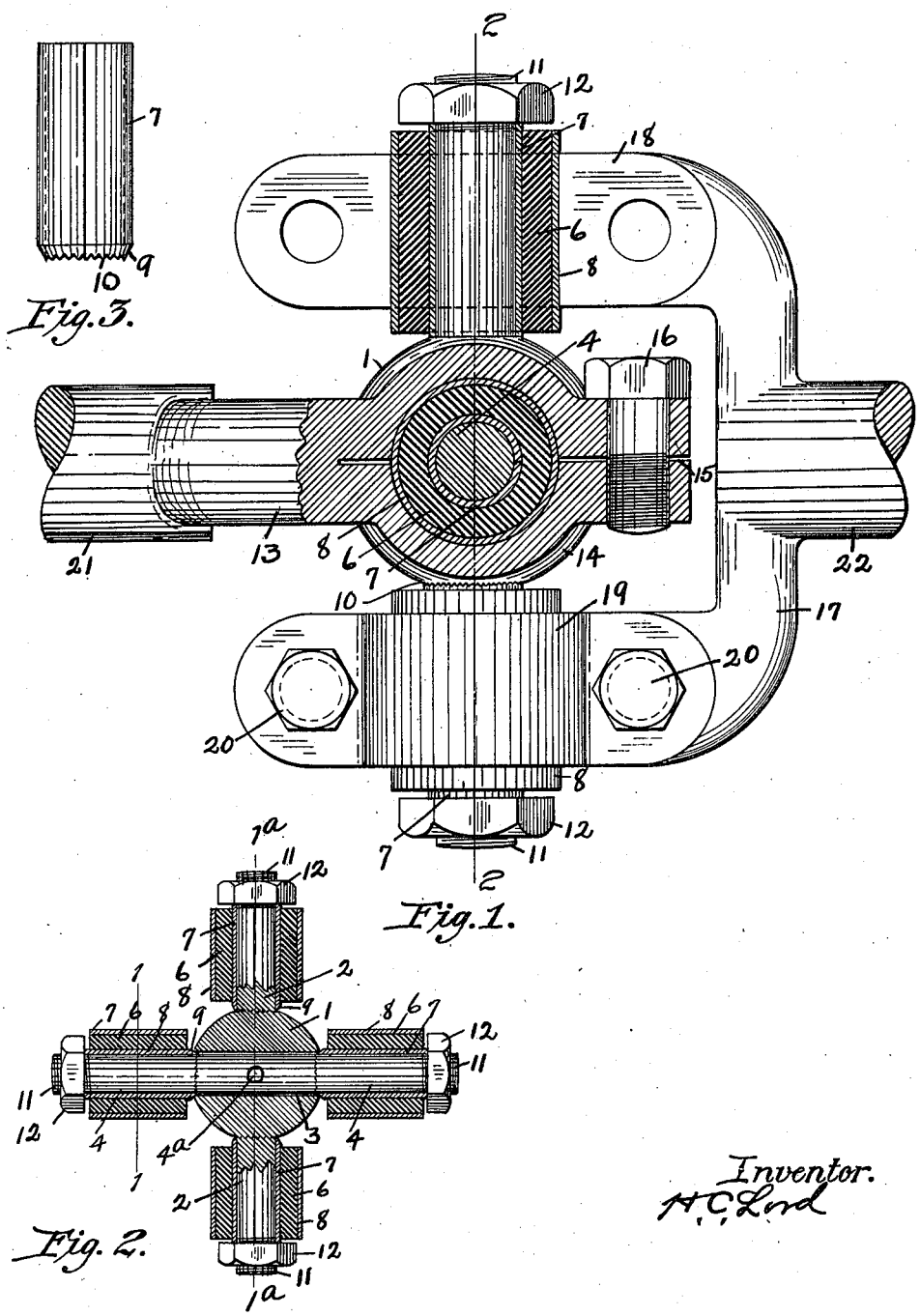
Inventor.
H. C. Lord Patented May 22, 1923.

1,456,068

UNITED STATES PATENT OFFICE.

HUGH C. LORD, OF ERIE, PENNSYLVANIA.

KNUCKLE JOINT.

Application filed January 17, 1921. Serial No. 437,747.

*To all whom it may concern:*

Be it known that I, HUGH C. LORD, a citizen of the United States, residing at Erie, in the county of Erie and State of Pennsylvania, have invented new and useful Improvements in Knuckle Joints, of which the following is a specification.

This invention is designed to form a knuckle joint which will operate silently and without lubrication. It is peculiarly adapted for what are ordinarily termed universal joints of the propeller shaft of an automobile because the joints without lubrication may be left exposed and may thus be easily repaired and the construction as a whole cheapened. The details of the joint itself also form a part of the invention.

The invention is illustrated in the accompanying drawings as follows:—

Fig. 1 shows a section on the line 1—1 in Fig. 2, one element of one of the joints being in section on the line 1ª—1ª in Fig. 2.

Fig. 2 is a section on the line 2—2 in Fig. 1.

Fig. 3 is a detached view of one of the inner shells of a joint element.

1 marks the pin mounting, and 2—2 pins extending therefrom and preferably formed integrally therewith. The pin mounting has the perforation 3 and a detachable pin 4 extends through the perforation 3, the pins 4 being at right angles to the pins 2. The pin 4 is locked in the perforation by a key 4ª.

Each joint on each pin has a cylindrical joint rubber or insert 6. This is vulcanized to an outer surface of an inner shell or sleeve 7 and to the inner surface of an outer shell or sleeve 8. The shell 7 is tapered at its inner end forming a sharp edge 9 and this edge is serrated at 10. The outer ends of the pins are screw-threaded at 11 and the shells are clamped against the mounting by means of nuts 12 arranged on the screw threads 11, the sharp edge and serrations indenting the mounting so as to lock the inner shell with the mounting and pins. One of the forks 13 of the knuckle joint is provided with sleeves 14 which are split at 15 so that the shells 8 may be slipped into the sleeves 14 and clamped by screws 16. The split sleeves 14 can be used with the detachable pins 4 but will not permit of assembling with the integral pins 2. The fork 17 has a sleeve 18, one portion of the sleeve being formed by a clamping plate 19 secured to the fork by screws 20 so that the shells 8 of this joint may be clamped with the felloe. A shaft 21 extends from the fork 13 and a shaft 22 from the fork 17 in the usual manner.

With this device when the knuckle joint is rotated if the shafts 21 and 22 are out of alinement the joints will be oscillated. Inasmuch as the shells at the inner and outer surfaces of the rubber are locked with the joint elements and the rubber is vulcanized with the shells, and as this oscillating movement is accomplished through the stretch of the rubber then consequently the rubber provides for the movement and obviates the necessity for lubricating. Further the rubber forms its own housing so as to obviate the interference of dirt and consequently there is no necessity for further covering. The covering cushions the joint to a slight extent which is desirable. It will be observed that the rubber is not only subjected to compression but if there is any compression at one side this movement is resisted by the stretch of the rubber at the opposite side of the joint.

In forming the inner shell I prefer to roll it up from a piece of flat metal as it is not necessary to close the joint as shown in Fig. 3. Where this method of manufacture is used the beveled and serrated edges 9 and 10 respectively may be formed before the metal is rolled into tubular form.

What I claim as new is:—

1. In a knuckle joint, the combination of pins arranged at right angles to each other; sleeves on said pins of larger diameter than the pins; and rubber inserts between the pins and sleeves, said inserts being locked with the pins and sleeves whereby oscillating movement between the pins and sleeves is accomplished by the distortion of the rubber.

2. In a knuckle joint, the combination of pins arranged at right angles to each other; sleeves on said pins of larger diameter than the pins; and rubber inserts between the pins and sleeves, said inserts being locked by vulcanization with the pins and sleeves whereby oscillating movement between the pins and sleeves is accomplished by the distortion of the rubber.

3. In a knuckle joint, the combination of pins arranged at right angles to each other;

sleeves on said pins of larger diameter than the pins; and rubber inserts between the pins and sleeves, said inserts being locked with the pins and sleeves whereby oscillating movement between the pins and sleeves is accomplished by the distortion of the rubber, said pins and sleeves being provided with detachable shells of metal carrying the inserts.

4. In a knuckle joint, the combination of pins arranged at right angles to each other; sleeves on said pins of larger diameter than the pins; rubber inserts between the pins and sleeves, said inserts being locked with the pins and sleeves whereby oscillating movement between the pins and sleeves is acomplished by the distortion of the rubber, the pins and sleeves being provided with detachable shells to which the inserts are immediately attached; and means for locking the shells to the pins and sleeves.

5. In a knuckle joint, the combination of pins arranged at right angles to each other; sleeves on said pins of larger diameter than the pins; rubber inserts between the pins and sleeves, said inserts being locked with the pins and sleeves whereby oscillating movement between the pins and sleeves is accomplished by the distortion of the rubber, the pins and sleeves being provided with detachable shells to which the inserts are immediately attached; and means for locking the shells to the pins and sleeves, said means for locking the shells on the pins comprising serrated ends, and shoulders on the pins against which the serrations are clamped.

6. In a knuckle joint, the combination of pins arranged at right angles to each other; sleeves on said pins of larger diameter than the pins; rubber inserts between the pins and sleeves, said inserts being locked with the pins and sleeves whereby oscillating movement between the pins and sleeves is accomplished by the distortion of the rubber, the pins and sleeves being provided with detachable shells to which the inserts are immediately attached; and means for locking the shells to the pins and sleeves, said means for locking the shells on the pins comprising serrated ends, shoulders on the pins, screws on the pins, and nuts on the screws acting with the shells to clamp the serrated ends against the shoulders.

7. In a knuckle joint, the combination of pins arranged at right angles to each other; sleeves on said pins of larger diameter than the pins; rubber inserts between the pins and sleeves, said inserts being locked with the pins and sleeves whereby oscillating movement between the pins and sleeves is accomplished by the distortion of the rubber, the pins and sleeves being provided with detachable shells to which the inserts are immediately attached; and means for locking the outer shells comprising devices for contracting the sleeves on the shells.

8. In a knuckle joint, the combination of two sets of pins at right angles to each other; forks carrying sleeves operating in connection with said pins, and rubber inserts between the sleeves and pins, said rubber inserts being secured to the sleeves and pins whereby an oscillating movement of the pins and sleeves is accomplished by the stretching of the rubber inserts.

9. In a joint element, the combination of an outer sleeve; an inner sleeve; and a rubber insert secured to the surfaces of the sleeves, one end of the inner sleeve being bevelled and serrated to form a sharp and serrated edge.

10. A joint comprising an outer sleeve; an inner sleeve; a rubber insert secured to the surfaces of said sleeves; a mounting; a pin extending through the inner sleeve and into the mounting, said inner sleeve having a tapered edge; and means on the pin for forcing the tapered edge against the mounting and along the line of separation between the pin and mounting.

11. A joint comprising an outer sleeve; an inner sleeve; a rubber insert secured to the surfaces of said sleeves; a mounting; a pin extending through the inner sleeve and into the mounting, said inner sleeve having a tapered and serrated edge; and means on the pin for forcing the tapered edge against the mounting and along the line of separation between the pin and mounting.

12. A joint comprising an outer sleeve; an inner sleeve; a rubber insert secured to the surfaces of said sleeves; a mounting; a pin extending through the inner sleeve and into the mounting, said inner sleeve having a tapered and serrated edge; and means on the pin for forcing the serrations into engagement with the mounting, the serrations indenting the mounting to lock the inner sleeve with the mounting.

13. In a knuckle joint, the combination of a pin mounting; joint elements carried by the mounting comprising central metallic cores carried by the mounting; sleeves surrounding the cores; rubber inserts locked with the cores and sleeves and receiving the oscillatory movement between the cores and sleeves through the distortion of the rubber, said joint elements being removable from the mounting; and shaft members connected with said joint members.

14. In a knuckle joint, the combination of a pin mounting; joint elements carried by the mounting comprising central metallic cores carried by the mounting; sleeves surrounding the cores; rubber inserts locked with the cores and sleeves and receiving the oscillatory movement between the cores and sleeves through the distortion of the rubber, the locking with the cores being by vulcanization, said joint elements being removable from the mounting; and shaft members connected with said joint members.

15. In a knuckle joint, the combination of a pin mounting; joint elements carried by the mounting comprising central metallic cores carried by the mounting; sleeves surrounding the cores; rubber inserts locked with the cores and sleeves and receiving the oscillatory movement between the cores and sleeves through the distortion of the rubber, the locking with the cores and sleeves being by vulcanization, said joint elements being removable from the mounting; and shaft members connected with said joint members.

In testimony whereof I have hereunto set my hand.

HUGH C. LORD.